COLUMBIA, STORKING & WOODRUFF.
Carriage-Spring.
No. 64,634.
Patented May 14, 1867.
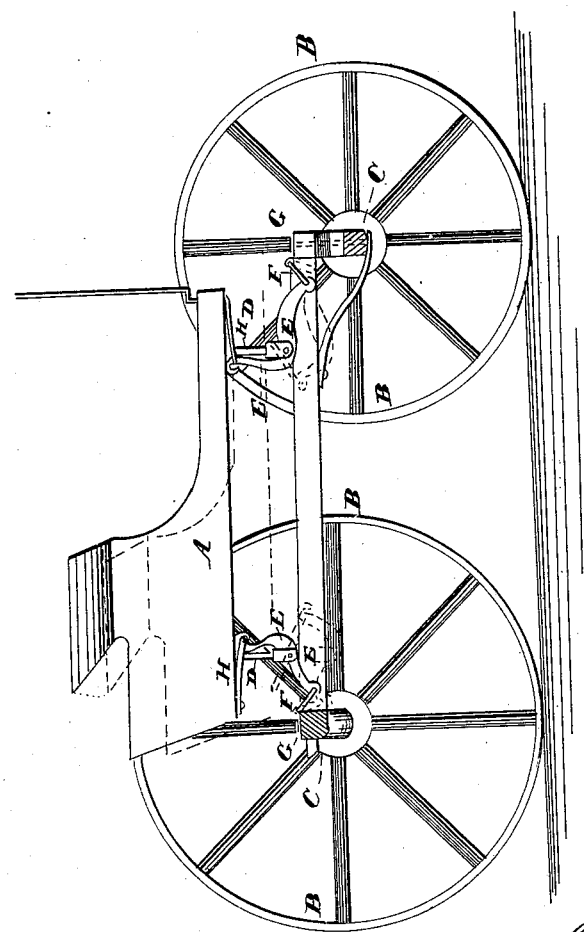

United States Patent Office.

DANA L. COLUMBIA, RANSLER V. STOCKING, AND CHARLES W. WOODRUFF, OF MORRISON, ILLINOIS.

Letters Patent No. 64,634, dated May 14, 1867.

IMPROVEMENT IN SPRINGS FOR VEHICLES.

The Schedule referred to in these Letters Patent and making part of the same.

TO ALL WHOM IT MAY CONCERN:

Be it known that we, DANA L. COLUMBIA, RANSLER V. STOCKING, and CHARLES W. WOODRUFF, of Morrison, in the county of Whitesides, and State of Illinois, have invented a new and useful Improvement in Springs for Carriages and other Vehicles; and we do hereby declare that the following is a full, clear and exact description of the same, reference being had to the annexed drawings, making part of this specification, in which the said springs and the mode of attaching and applying the same have been shown in a side elevation.

The following description will enable one skilled in the art to make and apply our improved spring.

A represents the body of any kind of vehicle; B B are the wheels, and C C the axles; D D are standards, screwed into or otherwise permanently attached to the bottom of the body. The lower part of the standards is formed with a bifurcarted head to receive the lever E, which is bent at nearly or quite a right angle. The horizontal arm of this lever is pivoted near the elbow to the standard D, the pivot passing through the two lugs which form the lower end of the standard. The horizontal arm of the lever is formed with an eye in the end, through which passes the link F, which is secured by the straps G to the axle. To the upper end of the vertical arm of the lever E is attached the spring of India rubber, H. This spring is a band of India rubber, fastened by suitable clamps to the bottom of the bed, and extending around the end of the lever, which is suitably formed to retain it in place. The action of the load upon the elastic band and other parts of the mechanism is shown by the red lines in the annexed drawings. By the increase of the load or a sudden jolt the spring H is stretched, and the lever E consequently bent down. The tension and elasticity of the spring must always be so proportioned as to be adapted to the character of the vehicle and its expected service, so as to give the requisite strength, and at the same time to afford that degree of elasticity which is essential to the comfort of the persons occupying the vehicle.

What we claim as our invention, and desire to secure by Letters Patent, is—

1. Suspending the bodies of vehicles upon bands of India rubber, so applied that the action of the load shall take effect in the elongation of the springs, and it be raised by their contraction, substantially as described.

2. The combination of the India-rubber bands H, standard D, and oscillating lever E, substantially as and for the purpose set forth.

In testimony whereof we have signed our names to this specification in the presence of two subscribing witnesses.

DANA L. COLUMBIA,
RANSLER V. STOCKING,
CHARLES W. WOODRUFF.

Witnesses:
F. W. CHAPMAN,
THOS. ALLEBRITT.